(12) United States Patent
Aida et al.

(10) Patent No.: US 10,882,936 B2
(45) Date of Patent: *Jan. 5, 2021

(54) COPOLYMER AND COMPOSITION CONTAINING SAME

(71) Applicant: AGC Inc., Chiyoda-ku (JP)

(72) Inventors: Shigeru Aida, Chiyoda-ku (JP); Daisuke Taguchi, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 180 days.

This patent is subject to a terminal disclaimer.

(21) Appl. No.: 15/959,634

(22) Filed: Apr. 23, 2018

(65) Prior Publication Data

US 2018/0237566 A1 Aug. 23, 2018

Related U.S. Application Data

(63) Continuation of application No. PCT/JP2016/083593, filed on Nov. 11, 2016.

(30) Foreign Application Priority Data

Nov. 13, 2015 (JP) .................................. 2015-223047

(51) Int. Cl.
*C08F 214/26* (2006.01)
*C08L 27/18* (2006.01)

(52) U.S. Cl.
CPC .......... *C08F 214/265* (2013.01); *C08L 27/18* (2013.01); *C08F 2500/12* (2013.01); *C08L 2203/30* (2013.01); *C08L 2205/025* (2013.01); *C08L 2205/03* (2013.01)

(58) Field of Classification Search
CPC ... C08F 214/265; C08F 2500/12; C08L 27/18
See application file for complete search history.

(56) References Cited

U.S. PATENT DOCUMENTS

| | | | | |
|---|---|---|---|---|
| 6,455,658 B1 * | 9/2002 | Okanishi | ............... | C08F 210/02 526/242 |
| 6,589,597 B1 * | 7/2003 | Ono | ..................... | C08F 210/02 264/460 |
| 7,820,774 B2 * | 10/2010 | Aida | ................... | C08F 214/265 525/199 |
| 9,074,033 B2 * | 7/2015 | Hirao | ..................... | H01B 7/292 |
| 9,306,135 B2 * | 4/2016 | Kasai | ....................... | H01L 33/56 |
| 9,328,214 B2 * | 5/2016 | Umino | ..................... | C08K 3/22 |
| 9,834,631 B2 * | 12/2017 | Sekiguchi | ............... | C08F 14/18 |
| 9,868,877 B2 * | 1/2018 | Nakatani | .............. | C08K 5/0091 |
| 2002/0107347 A1 * | 8/2002 | Kamiya | ................. | B29C 33/68 526/255 |
| 2003/0162923 A1 | 8/2003 | Funaki et al. | | |
| 2009/0301752 A1 * | 12/2009 | Aida | ................... | C08F 214/265 174/110 SR |
| 2014/0135438 A1 | 5/2014 | Umino et al. | | |
| 2014/0135465 A1 * | 5/2014 | Ueno | ......................... | C08J 3/12 526/255 |
| 2016/0145368 A1 * | 5/2016 | Okanishi | ............... | C08F 214/26 524/236 |
| 2018/0061522 A1 * | 3/2018 | Aida | ....................... | C08F 14/26 |

FOREIGN PATENT DOCUMENTS

| | | |
|---|---|---|
| CN | 104151754 A | 11/2014 |
| JP | 2004-238405 | 8/2004 |
| JP | 2005-023261 | 1/2005 |
| JP | 2013-108072 | 6/2013 |
| JP | 5445583 | 3/2014 |
| JP | 2015-4057 A | 1/2015 |
| WO | WO 2013/015202 A1 | 1/2013 |

OTHER PUBLICATIONS

International Search Report dated Dec. 20, 2016 in PCT/JP2016/083593 filed Nov. 11, 2016.

* cited by examiner

*Primary Examiner* — Rip A Lee
(74) *Attorney, Agent, or Firm* — Oblon, McClelland, Maier & Neustadt, L.L.P.

(57) ABSTRACT

To provide a copolymer capable of producing a molded article excellent in strength at a high temperature. A copolymer comprising ethylene units, tetrafluoroethylene units and other monomer units, wherein to the sum of ethylene units and tetrafluoroethylene units, the ethylene units are from 49 to 40 mol % and the tetrafluoroethylene units are from 51 to 60 mol %; to all units in the copolymer, other monomer units are from 2.6 to 6.0 mol %; the melting point is at least 230° C.; and the melt flow rate is from 1 to 15 g/10 min.

14 Claims, No Drawings

COPOLYMER AND COMPOSITION CONTAINING SAME

TECHNICAL FIELD

The present invention relates to a copolymer, and a composition containing the copolymer.

BACKGROUND ART

A copolymer having units derived from ethylene and units derived from tetrafluoroethylene (hereinafter referred to also as an ETFE copolymer) is excellent in heat resistance, chemical resistance, weather resistance, electrical insulation properties, mechanical properties, etc. and is used as a material for a molded article such as a wire coating layer or sheet, a hose, a sheet, etc.

In the ETFE copolymer, it is possible to improve, by copolymerizing a third monomer in addition to ethylene and tetrafluoroethylene, the mechanical strength such as the cracking resistance, etc. of its molded product, but introduction of the third monomer is likely to bring about a decrease in heat resistance (e.g. [0003] and [0008] in Patent Document 1).

With respect to such a problem, Patent Document 1 discloses that in the ETFE copolymer, by controlling the CH index to be within a specific range by copolymerizing, in addition to ethylene and tetrafluoroethylene, from 0.8 to 2.5 mol % of a specific fluorinated vinyl monomer having a relatively long side chain length, it is possible to improve the strength against repeated bending after heating the film at a high temperature for a long period of time.

PRIOR ART DOCUMENT

Patent Document

Patent Document 1: Japanese Patent No. 5445583

DISCLOSURE OF INVENTION

Technical Problem

However, according to the findings of the present inventors, a molded article of the ETFE copolymer disclosed in Patent Document 1 may sometimes undergo cracking when used in such a harsh environment that it is intermittently susceptible to stress such as vibration or shock at a high temperature, and thus, the strength cannot necessarily be said to be sufficient.

The present invention has an object to provide a copolymer capable of producing a molded article excellent in strength at a high temperature, and a composition containing such a copolymer.

Solution to Problem

The present inventors have paid attention to the elastic limit elongation at a high temperature, as a characteristic to be durable in use in an environment susceptible to stress at a high temperature. Further, they have paid attention to the tensile strength at break as a further characteristic.

And, as a result of intensive studies to improve these characteristics, it has been found that in an ETFE copolymer, by strictly controlling the proportions of the respective units so that the molar ratios of the units derived from ethylene and the units derived from tetrafluoroethylene, the content of units derived from other monomer to all units and the melting point, would be within the respective specific ranges, and by controlling MFR (molecular weight) of the copolymer to be within a specific range, it is possible to improve the elastic limit elongation at a high temperature and to obtain a sufficient tensile strength at break even at a high temperature, thus arriving at the present invention.

The present invention has the following embodiments [1] to [12].

[1] A copolymer comprising units derived from ethylene, units derived from tetrafluoroethylene, and units derived from other monomer i.e. a monomer other than ethylene and tetrafluoroethylene, wherein to the sum of the units derived from ethylene and the units derived from tetrafluoroethylene, the proportion of the units derived from ethylene is from 49 to 40 mol %, and the proportion of the units derived from tetrafluoroethylene is from 51 to 60 mol %, to all units in the copolymer, the proportion of the units derived from said other monomer is from 2.6 to 6.0 mol %, the melting point is at least 230° C., and the melt flow rate measured in accordance with ASTM D3159 under conditions of a temperature of 297° C. and a load of 49 N, is from 1 to 15 g/10 min.

[2] The copolymer according to [1], wherein the units derived from said other monomer include units derived from a compound represented by $CH_2=CX(CF_2)_nY$ (where X and Y are each independently a hydrogen atom or a fluorine atom, and n is an integer of from 2 to 8).

[3] The copolymer according to [2], wherein in said $CH_2=CX(CF_2)_nY$, n is from 3 to 7.

[4] A composition comprising the copolymer as defined in any one of [1] to [3], and a heat stabilizer.

[5] The composition according to [4], which further contains a copolymer that comprises units derived from ethylene, units derived from tetrafluoroethylene, and units derived from other monomer i.e. a monomer other than ethylene and tetrafluoroethylene, and that is a copolymer other than the copolymer as defined in [1].

[6] The composition according to [5], wherein the copolymer other than the copolymer as defined in [1] is a copolymer having units derived from a monomer having a polar functional group and having no fluorine atom.

[7] The composition according to [5] or [6], wherein the content of the copolymer other than the copolymer as defined in [1], is at most 30 parts by mass, to 100 parts by mass of the copolymer as defined in [1].

[8] A molded article formed by molding the copolymer as defined in any one of [1] to [3] or the composition as defined in any one of [4] to [7], of which the elastic limit elongation at 200° C. is at least 8.5%.

[9] The molded article according to [8], wherein the elastic limit elongation is at most 20%.

[10] A molded article formed by molding the copolymer as defined in any one of [1] to [3] or the composition as defined in any one of [4] to [7], of which the tensile strength at break at 200° C. is at least 3 MPa.

[11] The molded article according to [10], wherein the tensile strength at break is at most 10 MPa.

[12] A molded article formed by molding the copolymer as defined in any one of [1] to [3] or the composition as defined in any one of [4] to [7], of which the elastic limit elongation at 200° C. is at least 8.5%, and the tensile strength at break at 200° C. is at least 3 MPa.

Advantageous Effects of Invention

The copolymer of the present invention and the composition containing the copolymer can produce a molded article excellent in strength at a high temperature.

DESCRIPTION OF EMBODIMENTS

In the present invention, the "melting point" means the temperature at the endothermic peak due to melting measured by a differential scanning calorimetry (DSC) method.

In the present invention, the "melt flow rate (MFR)" means the mass of a polymer flowing out from an orifice with a diameter of 2 mm and a length of 8 mm in 10 minutes, as measured in accordance with ASTM D3159 under conditions of a temperature of 297° C. and a load of 49 N.

<Copolymer>

The copolymer of the present invention is a copolymer comprising units (hereinafter referred to also as E units) derived from ethylene, units (hereinafter referred to also as TFE units) derived from tetrafluoroethylene (hereinafter referred to also as TFE), and units (hereinafter referred to also as other units) derived from other monomer as a monomer other than ethylene and tetrafluoroethylene. Here, other units may be ones having some of the units converted to have another structure by treating the polymer.

(Other Monomer)

As other monomer, the following monomers (1) to (7) may be mentioned. Other units in the copolymer of the present invention may be of one type, or of two or more types.

Monomer (1): A compound represented by $CH_2=CX(CF_2)_nY$ (where X and Y are each independently a hydrogen atom or a fluorine atom, and n is an integer of from 2 to 8). Specific examples will be described later.

Monomer (2): A fluoroolefin having a hydrogen atom in an unsaturated group, such as vinylidene fluoride, vinyl fluoride, trifluoroethylene, hexafluoroisobutylene, etc.

Monomer (3): A fluoroolefin having no hydrogen atom in an unsaturated group, such as hexafluoropropylene (but excluding TFE).

Monomer (4): A perfluoro(alkyl vinyl ether), such as perfluoro(methyl vinyl ether), perfluoro(ethyl vinyl ether), perfluoro(propyl vinyl ether), perfluoro(butyl vinyl ether), etc.

Monomer (5): A perfluoro(vinyl alkenyl ether) having two unsaturated bonds and being cyclopolymerizable, such as $CF_2=CFOCF_2CF=CF_2$, $CF_2=CFO(CF_2)_2CF=CF_2$, etc.

Monomer (6): A fluorinated monomer having an aliphatic ring structure, such as perfluoro(2,2-dimethyl-1,3-dioxole), 2,2,4-trifluoro-5-trifluoromethoxy-1,3-dioxole, perfluoro(2-methylene-4-methyl-1,3-dioxolane), etc.

Monomer (7): A monomer having a polar functional group and having no fluorine atom (hereinafter referred to also as a polar functional group-containing monomer). The polar functional group contributes to improvement of adhesion.

As the polar functional group, a hydroxy group, a carboxy group, an epoxy group or an acid anhydride residue may be mentioned, and among them, an acid anhydride residue is preferred.

Specific examples of the polar functional group-containing monomer may be a vinyl ether having a hydroxy group and an epoxy group, an unsaturated carboxylic acid (such as maleic acid, itaconic acid, citraconic acid, undecylenic acid, etc.), and an unsaturated polycarboxylic acid anhydride (such as maleic anhydride, itaconic anhydride, citraconic anhydride, himic anhydride, etc.).

As other monomer, among the above monomers (1) to (7), the monomer (1) is preferred since it is good in reactivity with ethylene and tetrafluoroethylene and has a large effect to improve crack resistance at a high temperature. Specific examples of the monomer (1) may be $CH_2=CF(CF_2)_nF$, $CH_2=CF(CF_2)_nH$, $CH_2=CH(CF_2)_nF$, $CH_2=CH(CF_2)_nH$, etc., and especially $CH_2=CH(CF_2)_nF$ is preferred. The integer n in the monomer (1) is from 2 to 8, preferably from 3 to 7, more preferably from 4 to 6.

The copolymer of the present invention preferably contains, as other units, at least units (1) derived from the monomer (1).

The proportion of the units (1) to the sum of other units in the copolymer is preferably at least 85 mol %, more preferably at least 87 mol %, further preferably at least 90 mol %. It may be 100 mol %.

(Proportions of the Respective Units)

In the copolymer of the present invention, to the sum of E units and TFE units, the proportion of E units is from 49 to 40 mol %, preferably from 48 to 43 mol %, more preferably from 47 to 45 mol %. The proportion of TFE units is from 51 to 60 mol %, preferably from 52 to 57 mol %, more preferably from 53 to 55 mol %.

When the proportion of E units is at most 49 mol %, in the copolymer, the proportion of the chain of an E unit and an E unit, which is relatively susceptible to thermal decomposition, tends to be low, whereby excellent strength can be maintained for a long-term even at a high temperature.

When E units are at least 40 mol %, good mechanical properties of the molded article can be easily obtained.

The content proportion of other units in the copolymer of the present invention is, based on all units in the copolymer, from 2.6 to 6.0 mol %, preferably from 2.8 to 5.0 mol %, more preferably from 3.0 to 5.0 mol %, particularly preferably from 3.3 to 4.5 mol %.

When the content of other units is at least 2.6 mol %, excellent strength at a high temperature can easily be obtained. Especially the effect of improving the elastic limit elongation at a high temperature can be sufficiently obtained. Introduction of other units is considered to contribute to improvement of the elasticity at a high temperature of the molded body.

On the other hand, when the content of other units is at most 6.0 mol %, lowering of the melting point of the copolymer by the introduction of other units, is kept small, whereby good mechanical properties at a high temperature tend to be easily obtained.

(Melting Point)

The melting point of the copolymer of the present invention is at least 230° C., preferably at least 234° C., particularly preferably at least 240° C. When the melting point is at least 230° C., good heat resistance can be obtained, and good strength can be obtained even when the molded article is used at a high temperature. The upper limit of the melting point is not particularly limited, but, in view of excellent melt moldability, it is preferably at most 280° C., more preferably at most 250° C.

The melting point varies depending upon the molar ratio of E units and TFE units. In an ETFE copolymer wherein the proportion of TFE units to the sum of E units and TFE units is at most 60 mol %, as the molar ratio of E units:TFE units becomes closer to 50:50, the melting point becomes higher, and when the ratio of E units becomes larger or smaller than this, the melting point tends to be low.

Further, the melting point varies also depending upon the content of other units. The more the content proportion of other units, the lower the melting point tends to be.

For example, it is preferred to design the proportions of the respective units, so that the melting point of the copolymer would be within a range of from 230 to 280° C., preferably within a range of from 234 to 260° C., more preferably within a range of from 234 to 250° C.

(MFR)

The melt flow rate (MFR) of the copolymer of the present invention is from 1 to 15 g/10 min, preferably from 3 to 13 g/10 min, more preferably from 5 to 10 g/10 min. When the MFR of the copolymer is at least the lower limit value in the above range, the melt moldability will be excellent, and when it is at most the upper limit value in the above range, excellent strength at a high temperature will be easily obtained.

The MFR of the copolymer can be adjusted by the molecular weight. The larger the molecular weight, the smaller the MFR will be.

(Method for Producing Copolymer)

The copolymer of the present invention is produced by polymerizing ethylene, TFE and other monomer by a known polymerization method. The polymerization method may be a suspension polymerization method, a solution polymerization method, an emulsion polymerization method, etc., and a suspension polymerization method or a solution polymerization method is preferred, and a solution polymerization method is more preferred.

The solution polymerization method may, for example, be a method for polymerizing ethylene, tetrafluoroethylene and other monomer in a polymerization medium in the presence of a polymerization initiator and, as the case requires, a chain transfer agent.

The polymerization medium may be a perfluorocarbon, a hydrofluorocarbon, a hydrofluoroether, etc.

The polymerization initiator may be an azo compound, a peroxy dicarbonate, a peroxy ester, a non-fluorinated diacyl peroxide, a fluorinated diacyl peroxide, a fluorinated dialkyl peroxide, an inorganic peroxide, etc.

As the chain transfer agent, from such a viewpoint that the chain transfer constant is large so that the amount required may be less, an alcohol a, hydrocarbon, a hydrofluorocarbon, a ketone, a mercaptan, an ester or an ether is preferred, and from such a viewpoint that the chain transfer constant is larger, and the stability of terminal groups in the copolymer is high, an alcohol, a hydrocarbon or a hydrofluorocarbon is more preferred, and an alcohol or a hydrocarbon is further preferred. As the alcohol, from such a viewpoint that it is easily soluble in water, and can easily be separated from the copolymer after the production, methanol or ethanol is preferred. As the hydrocarbon, from such a viewpoint that the chain transfer constant is further larger, the stability of terminal groups of the copolymer is high, and the boiling point is sufficiently higher than room temperature and at most 100° C., n-pentane or cyclohexane is preferred.

The polymerization temperature is preferably from 0 to 100° C., more preferably from 20 to 90° C.

The polymerization pressure is preferably from 0.1 to 10 MPa, more preferably from 0.5 to 3 MPa.

The polymerization time is preferably from 1 to 30 hours, more preferably from 2 to 20 hours.

<Composition>

The composition of the present invention contains a copolymer of the present invention.

The composition of the present invention may contain, to an extent not to impair the effects of the present invention, a component other than the copolymer of the present invention. Other component may, for example, be other resin, an additive, etc.

Other resin may be a copolymer comprising TFE units and E units other than the copolymer of the present invention, or a melt-moldable fluororesin other than a copolymer comprising TFE units and E units.

The additive may, for example, be a thermal stabilizer, a pigment, an ultraviolet absorber, a filler, a crosslinking agent, a crosslinking aid, an organic peroxide, etc.

In the composition (100 mass %), the content of the copolymer of the present invention is preferably at least 50 mass %, more preferably at least 80 mass %, more preferably at least 90 mass %.

(Other Resin)

The composition of the present invention preferably contains, as at least part of other resin, a copolymer comprising TFE units and E units other than the copolymer of the present invention (hereinafter referred to as "other ETFE copolymer"). As other ETFE copolymer, a copolymer containing the above-mentioned other units, is preferred, and, in particular, the following copolymer (7) is preferred. In other ETFE copolymer, the content proportion of other units including the following units (7) is preferably at most 6.0 mol %, to all units.

Copolymer (7): a copolymer comprising E units, TFE units and other units, wherein at least some of other units include units (7) derived from the above monomer (7) (but, excluding the copolymer of the present invention). As other units, it is preferred that in addition to units (7), the above-mentioned units (1) are also included.

Monomer (7) is a polar functional group-containing monomer, and in a case where the composition of the invention contains the copolymer (7), the copolymer (7) contributes to improvement in adhesion of the composition.

The proportion of the units (7) to all units in the copolymer (7) is preferably from 0.01 to 5 mol %, more preferably from 0.05 to 3 mol %, more preferably from 0.1 to 1 mol %. When the proportion of the units (7) is within the above range, a sufficient adhesion improving effect can be easily obtained.

In a case where the composition of this invention contains other ETFE copolymer, the content of other ETFE copolymer to 100 parts by mass of the copolymer of the present invention is preferably at most 30 parts by mass, more preferably at most 20 parts by mass. The lower limit is not particularly limited, but it is preferably at least 1 part by mass, more preferably at least 5 parts by mass, with a view to obtaining a sufficient effect of the addition.

When the composition of the present invention contains other resins, the proportion of other ETFE copolymer to the sum of other resins contained in the composition of the present invention is preferably from 50 to 100 mass %, more preferably from 70 to 100 mass %, and further preferably from 80 to 100 mass %.

(Heat Stabilizer)

The composition of the present invention preferably contains a heat stabilizer.

As the heat stabilizer, cuprous oxide (copper (I) oxide), cupric oxide (copper (II) oxide), cuprous iodide or cupric iodide is preferred. As the heat stabilizer, from the viewpoint of excellent stability even in air with high humidity, cupric oxide is more preferred.

The content of the heat stabilizer is, based on 100 parts by mass of the copolymer of the present invention, preferably from 0.00015 to 0.02 parts by mass, more preferably from 0.0002 to 0.005 parts by mass, particularly preferably from 0.0003 to 0.002 parts by mass. When the content of the heat stabilizer is within the above range, even when the molded article obtainable by molding the composition of the present invention is used at a high temperature, good strength will be obtained, and coloration will also be suppressed.

(Molded Article)

The copolymer of the present invention or the composition of the present invention has a melt moldability, whereby it is possible to produce a molded article having a various shape by a known molding method such as injection molding, extrusion molding, heat pressing or the like.

A molded article obtainable by molding the copolymer of the present invention or the composition of the present invention is particularly excellent in strength at a high temperature.

For example, it is possible to obtain a molded article, of which the tensile strength at break at 200° C. is at least 3 MPa, and the elastic limit elongation at 200° C. is at least 8.5%. The testing methods will be described later.

When the above tensile strength and elastic limit elongation are satisfied, cracking is less likely to occur even if used in an environment to receive a stress of e.g. vibration or shock at a high temperature of from about 100 to 200° C. intermittently.

The larger the elastic limit elongation at a high temperature, the larger the elongation becomes from the elastic deformation until the transition to plastic deformation when the molded body is deformed under a stress of e.g. vibration at a high temperature, whereby the molded body will be less likely to undergo plastic deformation. If the molded body would undergo plastic deformation to have its thickness changed, the molded body tends to break upon receipt of the intermittent stress such as vibration. Therefore, the larger the elastic limit elongation at a high temperature, the better the durability in such a situation where a stress is exerted to the molded body at a high temperature.

In a case where the molded article of the present invention is used in an environment to receive a stress of e.g. vibration or shock at a high temperature intermittently, the molded article will repeatedly undergo fine expansion and contraction. If elongation in such expansion and contraction exceeds the elastic limit elongation, the molded article undergoes plastic deformation. If the molded article undergoes plastic deformation and its thickness changes, in a case of receiving a stress intermittently, the strength of the molded article will be lowered, and cracking tends to occur. That is, the larger the elastic limit elongation is, the less likely the molded article will undergo plastic deformation, the less likely the cracking tends to occur, the better the durability will be, such being preferred.

Further, under a normal situation of use, a molded body will not be deformed to the tensile elongation at break, and therefore, the tensile elongation at break is not as important as the elastic limit elongation, however, the tensile strength at break is also important in considering the durability of the molded body in a state that deviates from the normal condition of use.

The larger the tensile strength at break, the better, because the allowable stress up to fracture will thereby be large.

The above elastic limit elongation is preferably at least 8.5%, more preferably at least 9.0%. The upper limit is not particularly limited, but practically, it is at a level of at most 20%.

The tensile strength at break is preferably at least 3 MPa, more preferably at least 3.5 MPa, most preferably at least 4.5 MPa. The upper limit is not particularly limited, but practically, it is at a level of at most 10 MPa.

<Applications>

The copolymer or composition of the present invention is useful not only as a material for various molded articles to be used at normal temperatures, but also as a material for molded articles to be used at high temperatures.

For example, it is suitable as a material for tubes, hoses, tanks, seals, wires, cables, films, sheets, bottles, fibers, etc.

The tubes or hoses may, for example, be tubes or hoses for chemicals, tubes or hoses for pesticides, tubes or hoses for drinks, hydraulic tubes or hoses, tubes or hoses for automobile fuel piping, radiator hoses for automobiles, turbo hoses, brake hoses, air conditioning hoses, hoses for fuel cells, industrial hoses for electric parts or for transporting juices, pasty foods, etc., chemical tubes, pneumatic tubes or hoses, hoses for transporting a fuel such as gasoline, diesel oil, alcohol, etc., hot water supply hoses, etc.

The tanks may, for example, be radiator tanks for automobiles, chemical tanks, medical bags, multi-layer bottles for chemical liquid storage containers, fuel tanks, containers for highly corrosive or erosive chemical liquids such as acids and alkalis like semiconductor chemical solutions, or containers for slurries of abrasive, containers for urea water in a system of spraying urea water to a diesel engine exhaust gas to reduce NOX, etc.

The seals may, for example, be a sealing layer for a LIB aluminum laminate, various automotive seals such as O-rings for fuel pumps, chemical related seals such as seals for pumps or flow meters for chemicals, various machine related seals such as seals for hydraulic equipment, etc.

Wire covering material for wires or cables can be suitably used for wrapping wires, automotive wires, aircraft wires, wires for robots, motor coil wires, foam electric wires, etc.

The films or sheets may be a single layered or multilayered film (or referred to also as a laminate) used in the following applications as at least a part thereof. An interlayer insulating film for an electronic substrate, a film to be laminated on a steel plate for a building material or storage can for a solvent or solution, a battery packaging for e.g. a lithium ion battery having a metal foil such as aluminum laminated as soft moisture-proof packaging, a medical or chemical liquid soft packaging material laminated with e.g. polyethylene, polypropylene, an ethylene vinyl acetate copolymer, etc., a laminate film for an infusion bag or blood bag, an industrial film for an agricultural house or of a membrane structure, a release film, specifically a single layered or multilayered release film for producing a cast film, a release film for producing a wiring substrate or an IC chip, a release film made of a laminate with e.g. polyethylene terephthalate, a release film to be used for molding a light-emitting diode sealing material, etc. A food packaging or wrapping film, a sliding member required to have high chemical resistance, such as a diaphragm for a diaphragm pump, or various packings, a belt conveyor, an insulating coating film for a wire, a material for a beverage can made of a laminate with a stainless steel sheet, a surface protection plate for a cookware, a protective film for an interior or exterior decorative plate, a coating film for a vapor outlet part of a humidifier, an exterior material or roofing material made of a laminate with e.g. polycarbonate, a belt made of a laminate with e.g. a urethane resin or glass cloth, a balloon material made of a laminate with e.g. a woven aramid fabric, a membrane-structured film made of a laminate with a polyamide, an ethylene vinyl acetate resin, a rubber, etc., a surface material for a solar cell made of a laminate with an aluminum sheet, a heat-seal packaging material made of a laminate with e.g. an aluminum foil, a multi-layered film for whiteboard, a protective film for highway sound barrier, a laminated film for a shower shielding curtain, a laminated film for wallpaper, a heat resistant pouch film, an intermediate film for laminated glass, a film for an agricultural house, an adhesive film, a chemical resistant coating film for a rubber stopper, a protective film for solar cells, a motor insulating film, an office automation (OA) roll or OA belt having a fluoropolymer film laminated, a printed circuit board using a laminate having a metal foil such as a copper foil further laminated to a laminate of a fluorinated polymer and a polyimide, or a printed circuit board using a laminate having a metal foil laminated to a composite laminate of a fluorinated polymer and fiber substrate, industrial fields of e.g. radiofrequency radars, network routers, back planes, wireless infrastructures, etc.

EXAMPLES

The present invention will be described in more detail with reference to Examples below, but the present invention is not limited to these Examples.

Ex. 1 to 4 and 8 are Examples of the present invention, and Ex. 5, 6 and 7 are Comparative Examples.

<Measurement Methods>

(MFR)

Using a melt indexer (manufactured by Techno Seven Co., Ltd.) and in accordance with ASTM D3159, the mass (g) of a copolymer flowing out for 10 minutes from an orifice with a diameter of 2 mm and a length of 8 mm, was measured under conditions of a temperature of 297° C. and a load of 49 N and adopted as the MFR (g/10 min).

(Melting Point)

The temperature at the endothermic peak due to melting at the time when, by means of a scanning differential thermal analyzer (manufactured by SII, DSC7020), in an air atmosphere, 5 mg of a copolymer was heated to 300° C. at 10° C./min., held for 5 minutes, then cooled to 150° C. at 10° C./min., held for 5 minutes, and again heated to 300° C. at 10° C./min., was adopted as the melting point (° C.).

(Proportions of the Respective Units)

The proportions of the respective units were calculated from the result of measurement of the total fluorine amount and the result of the melt F-NMR measurement.

(Elastic Limit Elongation)

A press film having a thickness of 1 mm was punched out into test specimens of a shape (dumbbell specimens) specified in ASTM D 638 TYPE V, and by using the test specimens, by a method in accordance with JIS K7161, a tensile test was carried out at a test speed of 200 mm/min., to obtain a stress-strain curve, in which the elongation in distance between the jaws at the elastic limit point was adopted as the elastic limit elongation.

In the stress-strain curve, as the load on the material increases, the strain (elongation) increases correspondingly, but in the first stage, the stress and the strain maintain a constant proportional relationship, and the stress-strain curve becomes linear to the elastic limit point, whereby the elastic limit point is determined.

(Tensile Strength at Break)

In the stress-strain curve obtainable when a tensile test was carried out under the same conditions as the method for obtaining the elastic limit elongation, the stress at the time of breakage of the test specimen was adopted as the tensile strength at break.

Ex. 1

Into a jacketed stainless steel polymerization vessel having an internal volume of 1.2 L, by vacuuming, 19.4 g of $CH_2=CH(CF_2)_4F$ (hereinafter referred to also as PFBE), 5.41 g of methanol and 1,332.6 g of $CF_3(CF_2)_5H$ were charged, and inside of the polymerization vessel was heated to 66° C. with stirring. To the polymerization vessel, 163.6 g of TFE and 9.4 g of ethylene were charged, and 6.7 mL of a $CF_3(CF_2)_5H$ solution containing 4 mass % of tert-butyl peroxypivalate was added to initiate polymerization. During the polymerization reaction, a mixed gas of TFE and ethylene in a ratio (hereinafter referred to also as TFE/E)=54/46 (molar ratio) was continuously supplied to maintain the internal pressure (gauge pressure) to be 1.54 MPaG, and at the same time, PFBE corresponding to 4 mol % to the mixed gas was continuously supplied. At the time when the mixed gas was charged in an amount of 110 g, the supply of the gas was stopped, the polymerization vessel was cooled, and the remaining monomer gas was purged to obtain a slurry of a copolymer.

The obtained slurry was transferred to a flask, water in the same volume as the slurry was added, and the solvent was removed under heating to obtain the copolymer.

With respect to the obtained copolymer, the items shown in Table 1 were measured by the above methods. The results are shown in Table 1 (hereinafter the same applies).

Ex. 2

Into a jacketed stainless steel polymerization vessel having an internal volume of 1.2 L, by vacuuming, 19.4 g of PFBE, 4.47 g of methanol and 1,334.6 g of $CF_3(CF_2)_5H$ were charged, and inside of the polymerization vessel was heated to 66° C. with stirring. To the polymerization vessel, 163.6 g of TFE and 9.4 g of ethylene were charged, and 6.7 mL of a $CF_3(CF_2)_5H$ solution containing 4 mass % of tert-butyl peroxypivalate was added to initiate polymerization. During the polymerization reaction, a mixed gas of TFE/E=54/46 (molar ratio) was continuously supplied to maintain the internal pressure (gauge pressure) to be 1.52 MPaG, and at the same time, PFBE corresponding to 4 mol % to the mixed gas was continuously supplied. At the time when the mixed gas was charged in an amount of 110 g, the supply of the gas was stopped, the polymerization vessel was cooled, and the remaining monomer gas was purged to obtain a slurry of a copolymer.

The obtained slurry was transferred to a flask, water in the same volume as the slurry was added, and the solvent was removed under heating to obtain the copolymer.

Ex. 3

A jacketed stainless steel polymerization vessel having an internal volume of 21.3 L was evacuated. Into the polymerization vessel, 366 g of PFBE, 60.8 g of methanol and 20,922 g of $CF_3(CF_2)_5H$ were charged, and inside of the polymerization vessel was heated to 66° C. with stirring. Into the polymerization vessel, 2,467 g of TFE and 142 g of ethylene were charged, and 60 mL of a $CF_3(CF_2)_5H$ solution containing 9.3 mass % of tert-butyl peroxypivalate was added thereto to initiate polymerization. During the polymerization, a mixed gas of TFE/E=54/46 (molar ratio) was continuously additionally supplied to maintain the internal pressure to be the pressure 1.54 MPaG at the initiation of the polymerization and at the same time PFBE was continuously additionally supplied. The proportion of the additionally supplied PFBE to the sum of the additionally supplied ethylene and TFE, was adjusted to be 5 mol %. At the time when the mixed gas of TFE/E=54/46 (molar ratio) was supplied in an amount of 1,670 g, the supply of the gas was stopped, the polymerization vessel was cooled, and an unreacted mixed gas was purged to obtain a slurry of a copolymer.

The obtained slurry was transferred to a flask, water in the same volume of the slurry was added, followed by post treatment of removing the solvent by heating, to obtain the copolymer.

Ex. 4

Into a jacketed stainless steel polymerization vessel having an internal volume of 1.2 L, by vacuuming, 14.6 g of PFBE, 6.76 g of methanol and 1,329.7 g of $CF_3(CF_2)_5H$ were charged, and inside of the polymerization vessel was heated to 66° C. with stirring. Into the polymerization vessel, 163.6 g of TFE and 9.4 g of ethylene were charged, and 8.7 mL of a $CF_3(CF_2)_5H$ solution containing 2 mass % of tert-butyl peroxypivalate was added thereto to initiate polymerization. During the polymerization reaction, a mixed gas of TFE/E=54/46 (molar ratio) was continuously supplied to maintain the internal pressure (gauge pressure) to be 1.56 MPaG, and at the same time, PFBE corresponding to 3 mol % to the mixed gas was continuously supplied. At the time when the mixed gas was charged in an amount of 110 g, the supply of the gas was stopped, the polymerization vessel was cooled, and a remaining monomer gas was purged to obtain a slurry of a copolymer.

The obtained slurry was transferred to a flask, water in the same volume as the slurry was added, and the solvent was removed under heating to obtain the copolymer.

Ex. 5

Into a jacketed stainless steel polymerization vessel having an internal volume of 1.2 L, by vacuuming, 6.7 g of PFBE, 12.78 g of methanol and 1,216.1 g of $CF_3(CF_2)_5H$ were charged, and inside of the polymerization vessel was heated to 66° C. with stirring. Into the polymerization vessel, 146.3 g of TFE and 8.7 g of ethylene were charged, and 9.6 mL of a $CF_3(CF_2)_5H$ solution containing 1 mass % of tert-butyl peroxypivalate was added thereto to initiate polymerization. During the polymerization reaction, a mixed gas of TFE/E=54/46 (molar ratio) was continuously supplied to maintain the internal pressure (gauge pressure) to be 1.50 MPaG, and at the same time, PFBE corresponding to 1.4 mol % to the mixed gas was continuously supplied. At the time when the mixed gas was charged in an amount of 100 g, the supply of gas was stopped, the polymerization vessel was cooled, and a remaining monomer gas was purged to obtain a slurry of a copolymer.

The obtained slurry was transferred to a flask, water in the same volume as the slurry was added, and the solvent was removed under heating to obtain the copolymer.

Ex. 6

Into a jacketed stainless steel polymerization vessel having an internal volume of 1.2 L, by vacuuming, 7.3 g of PFBE, 6.8 g of methanol and 1,346.5 g of $CF_3(CF_2)_5H$ were charged, and inside of the polymerization vessel was heated to 66° C. with stirring. Into the polymerization vessel, 182.3 g of TFE and 4.7 g of ethylene were charged, and 7.7 mL of a $CF_3(CF_2)_5H$ solution containing 1 mass % of tert-butyl peroxypivalate was added thereto to initiate polymerization. During the polymerization reaction, a mixed gas of TFE/E=60/40 (molar ratio) was continuously supplied to maintain the internal pressure (gauge pressure) to be 1.46 MPaG, and at the same time, PFBE corresponding to 1.5 mol % to the mixed gas, was continuously added. At the time when the mixed gas was charged in an amount of 100 g, the supply of gas was stopped, the polymerization vessel was cooled, and a remaining monomer gas was purged to obtain a slurry of a copolymer.

The obtained slurry was transferred to a flask, water in the same volume as the slurry was added, and the solvent was removed under heating to obtain the copolymer.

Ex. 7

Into a jacketed stainless steel polymerization vessel having an internal volume of 1.3 L, by vacuuming, 22.7 g of PFBE, 22.7 g of 1,3-dichloro-1,1,2,2,3-pentafluoropropane (AK225cb manufactured by Asahi Glass Company, Limited) and 1,156.5 g of $CF_3(CF_2)_5H$ were charged, and inside of the polymerization vessel was heated to 66° C. with stirring. To the polymerization vessel, 187.6 g of TFE and 6.5 g of E were charged, and 10.6 mL of a $CF_3(CF_2)_5H$ solution containing 2.5 mass % of tert-butyl peroxypivalate, was added thereto to initiate polymerization. During the polymerization reaction, a mixed gas of TFE/E=60/40 (molar ratio) was continuously supplied to maintain the internal pressure (gauge pressure) to be 1.5 MPaG, and at the same time, PFBE corresponding to 4.0 mol % to the mixed gas was continuously supplied. At the time when the mixture gas was charged in an amount of 100 g, the supply of the gas was stopped, the polymerization vessel was cooled, and a remaining monomer gas was purged to obtain a slurry of a copolymer.

The obtained slurry was transferred to a flask, water in the same volume as the slurry was added, and the solvent was removed under heating to obtain the copolymer.

Ex. 8

A polymerization vessel equipped with a stirrer and having an internal volume of 430 L was deaerated, 417.9 kg of $CF_3CH_2O(CF_2)_2H$, 1.7 kg of methanol and 4.41 kg of PFBE were charged, the temperature inside of the polymerization vessel was raised to 66° C., and the pressure was raised to 1.5 MPa/G with a mixed gas of TFE and ethylene (TFE/E=83/17 (molar ratio)). 1,789 g of a $CF_3CH_2O(CF_2)_2H$ solution containing 2% of tert-butyl peroxypivalate as a polymerization initiator was charged to initiate polymerization. During the polymerization, a monomer mixed gas of TFE and ethylene (TFE/E=54/46 (molar ratio)) was continuously charged to bring the pressure to be constant. Further, PFBE corresponding to 2.8 mol % to the total molar amount of TFE and ethylene charged during the polymerization, was continuously charged. After 259 minutes from initiation of the polymerization at the time when 22 kg of the monomer mixed gas was charged, the inside temperature of the polymerization vessel was lowered to room temperature, and purging was carried out to normal pressure.

The obtained slurry-form copolymer (8-1) was charged into the granulation tank of 860 L charged with 340 kg of water, and granulated while the solvent was distilled off by raising the temperature to 105° C. under stirring. The obtained granulation product was dried at 150° C. for 15 hours, to obtain 24.3 kg of a dried granulation product of copolymer (8-1).

A polymerization vessel equipped with a stirrer and having an internal volume of 430 L was deaerated, 370.3 kg $CF_3CH_2O(CF_2)_2H$, 1.73 kg of methanol and 1.73 kg of $CH_2=CH(CF_2)_2F$ (hereinafter referred to also as PFEE)

were charged, the temperature inside of the polymerization vessel was raised to 66° C., and the pressure was raised to 1.5 MPa/G with a mixed gas of TFE and ethylene (TFE/E=89/11 (molar ratio)). As a polymerization initiator, 1,629 g of a $CF_3CH_2O(CF_2)_2H$ solution containing 4% of tert-butyl peroxypivalate, was charged to initiate polymerization. During the polymerization, a monomer mixed gas of TFE and ethylene (TFE/E=59/41 (molar ratio)) was continuously charged to maintain the pressure to be constant. Based on the total number of moles of TFE and ethylene charged during the polymerization, PFEE in an amount corresponding to 2.3 mol % and itaconic acid anhydride (hereinafter referred to also as IAH) in an amount corresponding to 0.6 mol %, were continuously charged. After 278 minutes from initiation of the polymerization at the time when 33 kg of the monomer mixture gas was charged, the temperature inside of the polymerization vessel was lowered to room temperature, and purging was carried out to normal pressure.

The obtained slurry-form copolymer (8-2) was charged into the granulation tank of 860 L charged with 340 kg of water, and granulated while the solvent was distilled off by raising the temperature to 105° C. with stirring. The obtained granulation product was dried at 150° C. for 15 hours to obtain 34.8 kg of a dried granulation product of copolymer (8-2).

With respect to the copolymer (8-2), from the results of the melt NMR analysis, the fluorine content analysis and the infrared absorption spectrum analysis, the copolymer (8-2) was found to be such that the ratio of TFE units/E units/PFEE units/IAH units was 55.2/42.0/2.2/0.6 (molar ratio). Here, the copolymer (8-2) is the above-mentioned other copolymer and corresponds to the above-mentioned copolymer (7).

80 parts by mass of granules (8-1) and 20 parts by mass of granules (8-2) were dry-blended and then melt-kneaded for a retention time of 2 minutes by means of a twin-screw extruder, to prepare pellets of the copolymer.

factory values in the tensile strength at break, and thus, they were excellent in strength at a high temperature.

Whereas, the copolymers in Ex. 5 and 6 were inferior in the elastic limit elongation at 200° C. Further, the copolymer in Ex. 7 had a low melting point and was inferior in strength at a high temperature.

This application is a continuation of PCT Application No. PCT/JP2016/083593, filed on Nov. 11, 2016, which is based upon and claims the benefit of priority from Japanese Patent Application No. 2015-223047 filed on Nov. 13, 2015. The contents of those applications are incorporated herein by reference in their entireties.

What is claimed is:

1. A copolymer comprising units derived from ethylene, units derived from tetrafluoroethylene, and units derived from a monomer other than ethylene and tetrafluoroethylene, wherein
    to a sum of the units derived from ethylene and the units derived from tetrafluoroethylene, a proportion of the units derived from ethylene is from 49 to 40 mol %, and a proportion of the units derived from tetrafluoroethylene is from 51 to 60 mol %,
    to all units in the copolymer, a proportion of the units derived from said monomer other than ethylene and tetrafluoroethylene is from 2.6 to 6.0 mol %,
    a melting point of the copolymer is at least 230° C., and
    a melt flow rate of the copolymer measured in accordance with ASTM D3159 under conditions of a temperature of 297° C. and a load of 49 N, is from 1 to 15 g/10 min.

2. The copolymer according to claim 1, wherein the units derived from said monomer other than ethylene and tetrafluoroethylene include units derived from a compound represented by $CH_2=CX(CF_2)_nY$, where X and Y are each independently a hydrogen atom or a fluorine atom, and n is an integer of from 2 to 8.

3. The copolymer according to claim 2, wherein in said compound represented by $CH_2=CX(CF_2)_nY$, n is from 3 to 7.

TABLE 1

|  |  | Ex. 1 | Ex. 2 | Ex. 3 | Ex. 4 | Ex. 5 | Ex. 6 | Ex. 7 |
|---|---|---|---|---|---|---|---|---|
| Copolymer | Proportion to the sum of E units and TFE units [mol %] E units | 47.4 | 47.3 | 46.1 | 47.1 | 46.2 | 41.1 | 43.2 |
|  | TFE units | 52.6 | 52.7 | 53.9 | 52.9 | 53.8 | 58.9 | 56.8 |
|  | Content of PFBE units to all units [mol %] | 3.4 | 3.4 | 4.3 | 2.6 | 1.5 | 1.4 | 4.6 |
|  | Melting point [° C.] | 241 | 241 | 234 | 249 | 258 | 243 | 222 |
|  | MFR [g/10 min] | 6.5 | 13 | 8.0 | 7.3 | 29 | 6.9 | 11 |
| Evaluations | Elastic limit elongation at 200° C. [%] | 12 | 12 | 17 | 10 | 6.8 | 7.2 | 18 |
|  | Tensile strength at break at 200° C. [MPa] | 6.8 | 5.4 | 3.5 | 8.0 | 5.4 | 7.2 | 2.0 |

TABLE 2

|  |  | Ex. 8 | |
|---|---|---|---|
|  |  | (8-1) | (8-2) |
| Copolymers before blending | Proportion to the sum of E units and TFE units [mol %] E units | 45.7 | 43.4 |
|  | TFE units | 54.3 | 56.6 |
|  | Content of PFBE units to all units [mol %] | 2.8 | — |
|  | Content of PFEE units to all units [mol %] | — | 2.3 |
|  | Melting point [° C.] | 251 | 256 |
|  | MFR [g/10 min] | 5.9 | 34 |
| Evaluation after blending | Elastic limit elongation at 200° C. [%] | 11 | |
|  | Tensile strength at break at 200° C. [MPa] | 7.1 | |

As shown by the results in Table 1 and Table 2, the copolymers in Ex. 1 to 4 and Ex. 8 satisfying the requirements of the present invention, exhibited high values in the elastic limit elongation at 200° C. and also exhibited satis- 4. A composition comprising the copolymer of claim 1, and a heat stabilizer.

5. The composition according to claim 4, wherein the copolymer claim 1 is included in an amount of at least 80 mass %.

6. The composition according to claim 4, wherein the copolymer claim 1 is included in an amount of at least 90 mass %.

7. The composition according to claim 4, further comprising another copolymer comprising units derived from ethylene, units derived from tetrafluoroethylene, and units derived from a monomer other than ethylene and tetrafluoroethylene.

8. The composition according to claim 7, wherein said another copolymer is a copolymer having units derived from a monomer having a polar functional group and having no fluorine atom.

9. The composition according to claim 7, wherein a content of said another copolymer is at most 30 parts by mass, to 100 parts by mass of the copolymer.

10. A molded article formed by molding the copolymer of claim 1 or a composition comprising the copolymer and a heat stabilizer, wherein an elastic limit elongation at 200° C. of the molded article is at least 8.5%.

11. The molded article according to claim 10, wherein the elastic limit elongation is at most 20%.

12. A molded article formed by molding the copolymer of claim 1 or a composition comprising the copolymer and a heat stabilizer, wherein a tensile strength at break at 200° C. of the molded article is at least 3 MPa.

13. The molded article according to claim 12, wherein the tensile strength at break is at most 10 MPa.

14. A molded article formed by molding the copolymer of claim 1 or a composition comprising the copolymer and a heat stabilizer, wherein an elastic limit elongation at 200° C. of the molded article is at least 8.5%, and a tensile strength at break at 200° C. of the molded article is at least 3 MPa.

* * * * *